2,971,891

PREPARATION OF CYANOCOBALAMINS

Helmuth Cords, Middlesex County, N.J., and John C. Megna, Kern County, Dale W. Grant, Santa Clara County, and Earl M. Butterworth, Kern County, Calif., assignors to Olin Mathieson Chemical Corporation, New York, N.Y., a corporation of Virginia No Drawing. Filed Apr. 8, 1959, Ser. No. 804,871

2 Claims. (Cl. 195—114)

This invention relates to an improved process for the preparation of cyanocobalamins (e.g. vitamin $B_{12}$; cyano-5,6-dimethylbenzimidazole cobalamin) and especially to a process for enhancement of the proportion of cyanocobalamins in fermentation procedures yielding as products a mixture of cyanocobalamins and hydroxocobalamins (e.g. vitamin $B_{12a}$; hydroxy-5,6-dibenzimidazole cobalamin).

It is known that physiologically active X—Y-cobalamins [using the nomenclature of Bernhauer et al., Angew. Chemie, 66, 776 (1954)], wherein Y represents the base present in the nucleotide portion of the cobalamin molecule (e.g., 5,6-dimethylbenzimidazole in vitamin $B_{12}$) and X represents the hydroxy or cyano radical can be prepared by culturing a vitamin $B_{12}$ producing microorganism in a nutrient medium in the presence or absence of a precursor (depending on the requirements of the microorganism and the particular X—Y-cobalamin desired) under aerobic or anaerobic conditions (depending on the requirements of the microorganism) and it is further known that the fermentation will yield a product which contains a mixture of both CN—Y-cobalamins and OH—Y-colabamins. While it is known that enhanced amounts of CN—Y-cobalamins and lesser amounts of OH—Y-cobalamins (proportional to the total amount of X—Y-cobalamins in the fermentation product) may be obtained by the addition to the fermentation medium of a source of cyanide ion (hydrogen cyanide and soluble salts thereof or cyanide complexes) it was found in actual practice that the addition to the fermentation medium of these known sources of cyanide ions exerts a toxic effect on vitamin $B_{12}$ fermentations and more importantly, these sources of cyanide ions gave relatively low yields (9 to 18%) of CN—Y-cobalamins based on the total amount of X—Y-cobalamins present in the fermentation product.

It is an object of this invention to provide an improved fermentation process for obtaining CN—Y-cobalamins. More specifically, it is an object of this invention to improve the ratio of CN—Y-cobalamins in the mixture of cobalamins obtained by culturing a vitamin $B_{12}$ producing microorganism.

The above and other objects are accomplished in accordance with this invention by adding to a fermentation medium containing a vitamin $B_{12}$ producing microorganism at least one member selected from the group consisting of copper cyanide and a cyanohydrin having the formula

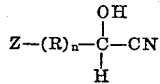

wherein R is an alkylene linkage having from 1 to 6 carbon atoms and from 0 to 6 hydroxyl radicals; $n$ is a whole number of from 0 to 1 and Z is a member selected from the group consisting of hydrogen and cyanohydroxymethyl. Among the members suitable for the practice of this invention there may be named copper cyanide (preferably in the cuprous form); monohydric cyanohydrins such as lactonitrile and glycolonitrile; dihydric cyanohydrins such as 3,3-dimethyl-2,4-dihydroxybutyroni-trile and 2,3-d hydroxypropionitrile (aldo cyanohydrin); polyhydriccyanohydrins such as 1-arabinose cyanohydrin; and dicyanohydrins such as 2,5-dihydroxyadiponitrile and 2,3-dihydroxysuccinonitrile.

The total amount of copper cyanide or cyanohydrin (above defined) which may be incorporated into the nutrient medium in the practice of this invention may vary within wide limits which are dependent on the toxicity, effectiveness and solubility of the particular member which is selected for use but it is preferable to use at least the stoichiometric amount necessary to convert all hydroxocobalamin produced to cyanocobalamin. In general it has been found that the addition of the cyano compound is preferably effected so that the total concentration of cyanide ion in the fermentation broth is within the range of 5 and 210 p.p.m., optimally in periodic incremental amounts of a solution of the compound. More specifically, if the source of cyanide ion used is relatively insoluble and toxic, such as cuprous cyanide, only a small amount preferably should be used so that only a low concentration of cyanide ions (i.e., 5 to 70 p.p.m. and preferably 35 to 50 p.p.m.) will be present in the broth, whereas if the compound is relatively non-toxic, such as glycolonitrile or lactonitrile, it is advantageous to adjust the addition so that a relatively high concentration of cyanide ions (i.e., 30 to 210 p.p.m. and preferably 100 to 180 p.p.m.) will be present in the broth. While under favorable circumstances there is no advantage in using a combination of compounds rather than a single compound, since either will bring about the biosynthesis of about 80 to 90% CN—Y-cobalamins (based on the total amount of X—Y-cobalamin produced), under certain conditions it has been found that yields of CN—Y-cobalamins will be greatly enhanced by the expedient of using a combination of two compounds which will supply cyanide ions to the fermentation broth. If more than one source of cyanide ion is added to the broth (e.g., cuprous cyanide and glycolonitrile) addition should be adjusted so that each compound yields the concentration of cyanide ions applicable when that compound is the sole source of cyanide ion (i.e., the addition of a mixture of cuprous and glycolonitrile would be adjusted to yield 35 to 50 p.p.m. and 100 to 180 p.p.m. of CN-respectively, from each of the sources).

The manner in which the source of cyanide is added to the fermentation broth is somewhat critical, the preferred manner being addition in increments, of equal or unequal size, over varying periods during the entire fermentation period.

The source of cyanide ion may be in solid form, or dissolved in a preferably aqueous medium. The optimum concentration of the solution will depend on several factors such as the solubility of the solute, the manner of addition i.e., whether incremental or single dose addition is employed and the concentration of CN-ions which it is desired to maintain. If it is desired to increase the solubility of the cyanide compound, such as cuprous cyanide, in water, preparatory to forming an aqueous solution this can readily be accomplished by treating the mixture with a base, such as aqueous ammonia.

The practice of this invention affords a means whereby a micrcorganism which produces physiologically active X—Y-cobalamins, when cultured under known fermentation condition in conventional nutrient media, can be induced to yield CN—Y-cobalamins in enhanced quantities. More particularly, it has been surprisingly found that by substituting a cyanide compound of this invention for a usually employed cyanide compound, such as potassium cyanide the ratio of cyanocobalamins to hydroxycobalamins in the product mixture can be increased from one wherein the former represents the minor fraction to one wherein it is the major product.

The microorganisms which may be employed in the practice of this invention include those of the genus Propionibacteria which are known to produce vitamin $B_{12}$ in the presence of a vitamin $B_{12}$ precursor (such as 5,6-dimethylbenzimidazole) among which are included *P. arabinosum* (A.T.C.C. 4965), *P. thoenii* (A.T.C.C. 4892), (A.T.C.C. 4871), *P. zeae* (A.T.C.C. 4964), *P. pentosaceum* (A.T.C.C. 4875) and *P. petersonii* (A.T.C.C. 4870); and those which produce vitamin $B_{12}$ without a precursor, such as *P. freudenreichii* (A.T.C.C. 6207).

The nutrient media useful in the process of this invention include the usual sources of assimilable carbon and nitrogen. As sources of assimilable carbon, there may be used: (1) carbohydrates such as glucose, fructose, xylose, galactose, lactose, and maltose; (2) substances containing carbohydrates such as whey, milk, cornsteep liquor, grain mashes, and molasses; (3) polyhydric alcohols such as glycerol and mannitol; (4) fats, such as lard oil, soybean oil, corn oil, butterfat and cotton seed oil; and (5) fatty acids such as acetic, propionic, pyruvic, stearic, palmitic, oleic, and linoleic. Sources of available nitrogen include: (1) organic nitrogen compounds such as proteinaceous materials e.g. casein, urea, soybean meal, fish meal, yeast or yeast products, whey or whey concentrates, amino acids and liver cake; and (2) inorganic compounds such as nitrates or ammonium compounds. The nutrient media should also include metallic cations including cobalt, molybdenum, potassium, sodium, magnesium, iron, copper, manganese, the anions chloride, sulfate, phosphate, and carbonate, and the vitamins, thiamin, niacin, biotin, folic acid, pyridoxine, riboflavin, and p-aminobenzoic acid. These ions and vitamins may be present in the crude materials used in the nutrient medium. In addition, of course, the cyanide compounds of this invention are also added as hereinbefore described. The fermentation process may be carried out at temperatures from about 20° C. to about 40° C. and may be operated under aerobic, anaerobic or microaerophillic conditions depending on the microorganism.

If the microorganism produces vitamin $B_{12}$ without the presence of a precursor, none is added to the broth. If a precursor (leading to the formation of Y in CN—Y-cobalamin), is necessary it may be added to the fermentation medium either initially, or continuously or intermittently during the incubation period. After a sufficient incubation time (about one to ten days) the fermented medium may be dried and incorporated as a supplement into the feed for chickens and pigs, or the cyanocobalamins therein may be recovered in more purified form by usual procedures.

When fermenting with a precursor requiring microorganism, the nature of the precursor employed depends on the physiologically active CN—Y-cobalamin desired. Thus, if vitamin $B_{12}$ is desired, 5,6-dimethylbenzimidazole or another vitamin $B_{12}$ precursor, such as 2,3-dimethyl-5,6-diaminobenzene, 2,3-dinitro-5,6-dimethylbenzene or 2,3-dimethyl-4-amino-5-nitrobenzene, may be used. Thus, as summarized in the following table, the nature of the resulting cobalamin will depend on the precursor chosen. In this table, the symbol Y is that in the formula Y-cobalamin.

| Precursor | Product (Y-cobalamins) | |
|---|---|---|
| | Name | Y is— |
| 5,6-Dimethylbenzimidazole; 2,3-Dimethyl-5,6-diaminobenzene; 2,3-Dinitro-5,6-dimethylbenzene; 2,3-Dimethyl-4-amino-5-nitro-benzene. | 5,6-Dimethylbenzimidazole-cobalamin. | (structure: 5,6-dimethylbenzimidazolyl) |
| Benzimidazole; 1,2-Diaminobenzene; 1,2-Dinitrobenzene; 1-Amino-2-nitro benzene. | Benzimidazole-cobalamin | (structure: benzimidazolyl) |
| 2-Nitro-4-trifluoromethylaniline; 5-Trifluoromethyl-benzimidazole; 4-Trifluoromethyl-phenylene-diamine-1,2. | 5-Trifluoromethyl-benzimidazole-cobalamin. | (structure: 5-CF₃-benzimidazolyl) |
| 4-Bromo-6-methoxy-benzimidazole; 3-Bromo-5-methoxy-phenylene-diamine-1,2. | 4-Bromo-6-methoxy-benzimidazole-cobalamin. | (structure: 4-Br-6-OCH₃-benzimidazolyl) |
| Quinazoline | Quinazoline-cobalamin | (structure: quinazolinyl) |
| 4(3H)-quinazoline | 3,4-Dihydro-4-oxoquinazoline-cobalamin. | (structure: 4-oxoquinazolinyl) |

| Precursor | Product (Y-cobalamins) | |
|---|---|---|
| | Name | Y is— |
| 2,4-Dichloroquinazoline | 2,4-Dichloroquinazoline-cobalamin. | 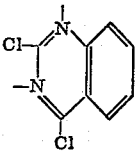 |
| 1-Acetamido-3-methoxyphenazine | 1-Acetamido-3-methoxyphenazine-cobalamin. | 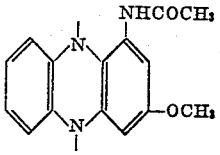 |
| 2-Hydroxyphenazine | 2-Hydroxyphenazine-cobalamin. | 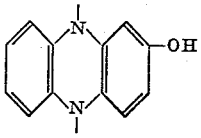 |
| 5-Methylbenzimidazole | 5-Methylbenzimidazole-cobalamin. | 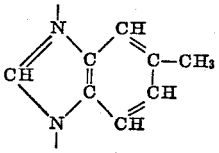 |
| Quinoxaline | Quinoxaline-cobalamin | 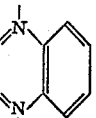 |
| Benzotriazole | Benzotriazole-cobalamin | 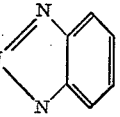 |

The following examples are presented to further illustrate the invention.

*Example I*

A medium containing 7.6% beet molasses, 1.5% yeast autolysate solids, 2.0% protein hydrolysate, 1.0% corn steep liquor, 5 p.p.m. cobalt (cobalt sulfate) and 2.0% $CaCO_3$ is dispensed in 1 liter Erlenmeyer flasks at the rate of 500 ml. per flask and autoclaved 20 minutes at 121° C. After cooling, the flasks are inoculated with an active vegetative culture of P. freudenreichii (A.T.C.C. 6207) and incubated at 30° C. on a slow rotary shaker for 96 hours. Five ml. aliquots of an aqueous glycolonitrile solution are added to the medium at 0, 19, 24, 43, 48, 66 and 72 hours after inoculation to yield a final total of 140 p.p.m. CN. [The glycolonitrile solution is prepared by adding 0.312 ml. of a 70% glycolonitrile solution to 55 mls. sterile water.] The flasks are adjusted twice daily to pH 7.0–8.0 with sterile sodium hydroxide. The progress of the fermentation is followed by periodic tests for residual sugar and contamination by conventional plating methods vitamin $B_{12}$ yield is about 6.4 mg. per liter.

At the end of the fermentation, the cells are harvested by centrifugation. The cell cream is mixed with one volume acetone and shaken for 20 minutes at room temperature. The acetone extract is separated and evaporated to approximately 1/10 volume, and washed with chloroform. The red pigments are extracted into phenol-benzene and the rich organic extract is washed with 0.5% sodium sesquicarbonate and water. One-half volume of acetone is added and the organic solution is extracted with distilled water. The aqueous phase is washed with chloroform and then concentrated to about 0.3 ml.

An aliquot of the aqueous phase is taken for potency determination and then 100–200 micrograms of pigment are applied to Whatman No. 3 MM paper. Twenty-seven cm. of this paper is exposed in 2 N acetic acid buffer to 280 volts for 16 hours in an electrophoresis migration chamber. Examination of the resulting electropherogram shows that the cyanocobalamin represents about 90% of the total cobalamin pigments.

*Example II*

The example is carried out in the same manner as Example I except for a lower level of glycolonitrile addition, and a concurrent decrease in cyanide ion concentration to 49 p.p.m. Cyanobalamin biosynthesis relative to total colabalmin pigments is 73%. Vitamin $B_{12}$ yield is 6.3 mg. per liter.

*Example III*

Following the procedure of Example I, except for an increase in the fermentation time and the use of 5 ml. aliquot portions of cuprous cyanide solution prepared by adding 166 mg. of CuCN to 100 ml. of water and treating with 5% aqua ammonia, in addition to the 70% glycolonitrile solution (instead of the latter per se) in amounts necessary to supply 35 p.p.m. CN from cuprous cyanide and 170 p.p.m. CN from glycolonitrile over a fermentation period of seven days, a product results, which upon purification and examination as outlined in Example I shows a cobalamin product containing about 90% vitamin $B_{12}$ and about 10% vitamin $B_{12a}$.

Example IV

Following the procedure described in Example I except for the addition of 10 ml. aliquots of a sterile solution of cuprous cyanide (CuCN) prepared by dissolving 166 milligrams of copper cyanide in 100 ml. water, to which was added 5 ml. of aqua ammonia, and sterilizing the solution for 10 minutes at 121° C. added to the medium at 8, 25, 32, 50, 56 and 75 hours after inoculation (in place of glycolonitrile) to yield a final total of 60 p.p.m. CN, cyanocobalamin production relative to hydroxocobalamin production is found to be 90:10.

Following the procedure of Example I correspondingly high yields of cyano-[5,6-dimethylbenzimidazole]-cobalamin, cyano-[benzimidazole]-cobalamin and cyano-[quinazoline]-cobalamin are readily obtained using as the fermenting microorganism *P. petersonii* (A.T.C.C. 4870), in the presence of, as the precursor, 5,6-dimethylbenzimidazole, benzimidazole and quinazoline, respectively.

Example V 30 liters of a medium containing (per liter): glucose: 30 g.; autolyzed yeast: 20 g.; $Co(NO_3)_2 \cdot 6H_2O$: 0.01 g.; tap water: 1 liter, are placed in a stainless steel fermentation unit of 38 liters capacity, heated at 121° for 30 minutes, and cooled to 30°. About 2,000 ml. of a slurry of $CaCO_3$ (containing 600 g. of $CaCO_3$), sterilized by autoclaving, is then added together with 1 liter of *Propionibacterium arabinosum* A.T.C.C. 4965 culture grown on the same medium for 72 hours in flasks kept at 30° C. and shaken on a reciprocating shaker (120–1 inch strokes per minute). A sterile alcoholic solution of 2-nitro-4-trifluoromethyl-aniline (sterlized by filtration through a fritted glass filter) containing 1 mg. per ml. is then added so that the final concentration of aniline is 5 mg. per liter (this supplementation being repeated at 24-hour intervals) and the culture is allowed to grow in the medium, under virtually anaerobic conditions while being agitated with a turbine mixer rotating at 87 r.p.m. Three hundred ml. aliquots of a 70% lactonitrile solution (prepared by adding 18 ml. of lactonitrile to 3.3 liters of sterile water) are added at 0, 24, 43 and 66 hours after inoculation to yield a final total of 80 p.p.m. CN.

After 72 hours incubation at 30°, a sterile solution of glucose is added so that the concentration of the glucose after addition is 30 g. per liter. After 5 days of incubation, the pH of the mixture is about 5.3. The fermented medium is then passed through a Sharples Super Centrifuge, and then further purified, concentrated and assayed in accordance with the procedure of Example I. Examination of the resulting electropherogram shows a 5-trifluoromethyl-benzimidazolecyano cobalamin production relative to the corresponding hydroxo form, of 90:10.

In direct contrast to the results obtained when proceeding in accordance with this invention, it has been found that incorporating other sources of cyanide ions into the fermentation broth has only slight effect on the yield of cyanocobalamin relative to total cobalamin product.

The following experiments were conducted using sources of cyanide ion outside the scope of this invention, in fermentation processes which are otherwise identical to those outlined in the examples.

(A) An experiment was conducted exactly as described in Example I except for the addition of 5 ml. aliquots of a solution of acetone cyanohydrin at 0, 24, 31, 47, 54 and 71 hours after inoculation (in place of the glycolonitrile solution) to yield a cyanide ion concentration of 120 p.p.m. (the acetone cyanohydrin solution being prepared by adding 0.55 ml. acetone cyanohydrin to 80 ml. of sterile water). The cells were harvested from the medium after 75 hours fermentation, and tested by the electrophoresis method, as described in Example I. Cyanocobalamin content relative to hydroxocobalamin was 25:75.

(B) An experiment was conducted exactly as outlined in A except for the addition of a potassium cyanide solution (prepared by dissolving 625 mg. in 250 ml. of water and sterilizing the solution for 10 minutes at 121° C.) at 0, 17, 24, 41, 48, 65, 71 and 72½ hours after inoculation (instead of the acetone cyanohydrin used in experiment A). The cells were harvested after 72½ hours, extracted and tested by the electrophesis method as in experiment A. Cyanocobalamin production relative to hydroxocobalamin was 25:75.

Many other cyanide containing compounds were tested in experiments similar to A and B but these compounds resulted in a cyanocobalamin production relative to hydroxocobalamin of less than 15:85. Among the compounds tested were inorganic compounds such as dicyandiamide, calcium cyanamide, zinc cyanide, nickel cyanide, potassium cyanate, cyanamide potassium ferrocyanide and potassium ferricyanide; simple nitriles such as propionitrile, allyl nitrile, n- and iso-butyronitrile, acrylonitrile and acetonitrile; carbonyl-containing-nitriles such as ethyl cyanoacetate, malononitrile; p-cyano benzoic acid, cyano-acetic acid, a cyanoacetamide and (cyanoacetyl) urea; and heterocyclic nitriles such as 2-cyanoimino-4,6-dihydroxy-pyrimidine, 2-cyanopyridine, 3-cyanopyridine, 4-cyanopyridine and 2-cyanoimino-6-hydroxy-4-methylpyrimidine. The compounds were relatively ineffective for the object of this invention.

The invention may be variously otherwise embodied within the scope of the appended claims.

What is claimed is:

1. The process of preparing cyanocobalamins which comprises culturing a vitamin $B_{12}$ producing microorganism of the genus Propionibacteria in a nutrient medium containing cuprous cyanide as a source of cyanide ions.

2. The process of preparing cyanocobalamins which comprises culturing *Propionibacterium freundenreichii* in a nutrient medium containing cuprous cyanide as a source of cyanide ions.

References Cited in the file of this patent

UNITED STATES PATENTS

| | | |
|---|---|---|
| 2,842,540 | Perlman | July 8, 1958 |
| 2,872,444 | Perlman | Feb. 3, 1959 |

FOREIGN PATENTS

| | | |
|---|---|---|
| 731,706 | Great Britain | June 15, 1955 |
| 505,358 | Canada | Aug. 24, 1954 |